US011155462B2

(12) United States Patent
Arkadakskiy et al.

(10) Patent No.: US 11,155,462 B2
(45) Date of Patent: *Oct. 26, 2021

(54) HYDROGEN PRODUCTION FROM HYDROCARBONS WITH NEAR ZERO GREENHOUSE GAS EMISSIONS

(71) Applicant: Saudi Arabian Oil Company, Dhahran (SA)

(72) Inventors: Serguey Viktorov Arkadakskiy, Dhahran (SA); Humoud W. Al-Utaibi, Dhahran (SA); Noushad Kunnummal, Dhahran (SA); Zeyad Tareq Ahmed, Dhahran (SA); Faisal Salman Al-Jar, Dhahran (SA); Christopher Ellis Stapp, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 149 days.

This patent is subject to a terminal disclaimer.

(21) Appl. No.: 16/505,378

(22) Filed: Jul. 8, 2019

(65) Prior Publication Data

US 2020/0317513 A1    Oct. 8, 2020

Related U.S. Application Data

(60) Provisional application No. 62/830,945, filed on Apr. 8, 2019.

(51) Int. Cl.
| | | |
|---|---|---|
| *C01B 3/38* | (2006.01) | |
| *C01B 3/56* | (2006.01) | |
| *C01B 32/50* | (2017.01) | |
| *C01C 1/04* | (2006.01) | |
| *C01B 3/04* | (2006.01) | |
| *B65G 5/00* | (2006.01) | |
| *E21B 41/00* | (2006.01) | |
| *C25B 1/02* | (2006.01) | |
| *C01B 3/36* | (2006.01) | |

(52) U.S. Cl.
CPC .................. *C01B 3/38* (2013.01); *B65G 5/00* (2013.01); *C01B 3/047* (2013.01); *C01B 3/36* (2013.01); *C01B 3/56* (2013.01); *C01B 32/50* (2017.08); *C01C 1/04* (2013.01); *C25B 1/02* (2013.01); *E21B 41/0064* (2013.01); *C01B 2203/025* (2013.01); *C01B 2203/0233* (2013.01); *C01B 2203/042* (2013.01); *C01B 2203/0475* (2013.01); *C01B 2203/0485* (2013.01); *C01B 2203/1241* (2013.01); *C01B 2203/86* (2013.01)

(58) Field of Classification Search
CPC ....... C01B 32/50; C01B 3/36; C01B 2203/86; C01B 2203/0233; C01B 2203/025; C01B 2203/068; C01B 3/48; C01C 1/04; B65G 5/00; E21B 41/0064
See application file for complete search history.

(56) References Cited

U.S. PATENT DOCUMENTS

| | | | |
|---|---|---|---|
| 1,843,063 A | 1/1932 | Burke | |
| 1,904,592 A | 4/1933 | Young et al. | |
| 7,819,932 B2 | 10/2010 | Rhinesmith et al. | |
| 2009/0117024 A1 | 5/2009 | Weedon et al. | |
| 2013/0022887 A1* | 1/2013 | Kojima | H01M 8/0656 429/421 |
| 2017/0152219 A1* | 6/2017 | Mabrouk | C01B 3/36 |

FOREIGN PATENT DOCUMENTS

EP    2199254 A1    6/2010

OTHER PUBLICATIONS

Bacon et al., Simulating Geologic Co-Sequestration of Carbon Dioxide and Hydrogen Sulfide in a Basalt Formation; International Journal of Greenhouse Gas Control 21 (2014) 165-176; pp. 1-12.
International Search Report and Written Opinion for International Application No. PCT/US2020/026783 dated Jul. 17, 2020; pp. 1-15.
Sigfusson et al., Reducing Emissions of Carbon Dioxide and Hydrogen Sulphide at Hellisheidi Power Plant in 2014-2017 and the Role of CarbFix in Achieving the 2040 Iceland Climate Goals; Science Direct, Energy Procedia 146 (2018) 135-145; pp. 1-11.
Al-Zareer,et al. "Transient analysis and evaluation of a novel pressurized multistage ammonia production system for hydrogen storage purposes", Journal of Cleaner Production 196, pp. 390-399, 2018.
Cormos, et al., "Assessment of hydrogen and electricity co-production schemes based on gasification process with carbon capture and storage", International Journal of Hydrogen Energy 34, pp. 6065-6077, 2009.
Gislason, et al., "A brief history of CarbFix: Challenges and victories of the project's pilot phase", Energy Procedia 146, pp. 103-114, 2018.
Gunnarsson, et al., "The rapid and cost-effective capture and subsurface mineral storage of carbon and sulfur at the CarbFix2 site", International Journal of Greenhouse Gas Control 79, pp. 117-126, 2018.
McGrail, et al., "Field Validation of Supercritical CO2 Reactivity with Basalts", Environmental Science & Technology Letters, pp. 6-10, 2017.
Oelkers, et al., "Mineral Carbonation of CO2", Elements, vol. 4, pp. 333-337, Oct. 2008.
Wettenhall, et al., "The Effect of CO2 Purity on the Development of Pipeline Networks for Carbon Capture and Storage Schemes", International Journal of Greenhouse Gas Control 30, pp. 197-211, 2014.

\* cited by examiner

*Primary Examiner* — Jafar F Parsa
(74) *Attorney, Agent, or Firm* — Bracewell LLP; Constance G. Rhebergen; Kevin R. Tamm

(57) ABSTRACT

Methods and systems for producing hydrogen substantially without greenhouse gas emissions, the method including producing a product gas comprising hydrogen and carbon dioxide from a hydrocarbon fuel source; separating hydrogen from the product gas to create a hydrogen product stream and a byproduct stream; injecting the byproduct stream into a reservoir containing mafic rock; and allowing components of the byproduct stream to react in situ with components of the mafic rock to precipitate and store components of the byproduct stream in the reservoir.

12 Claims, 1 Drawing Sheet

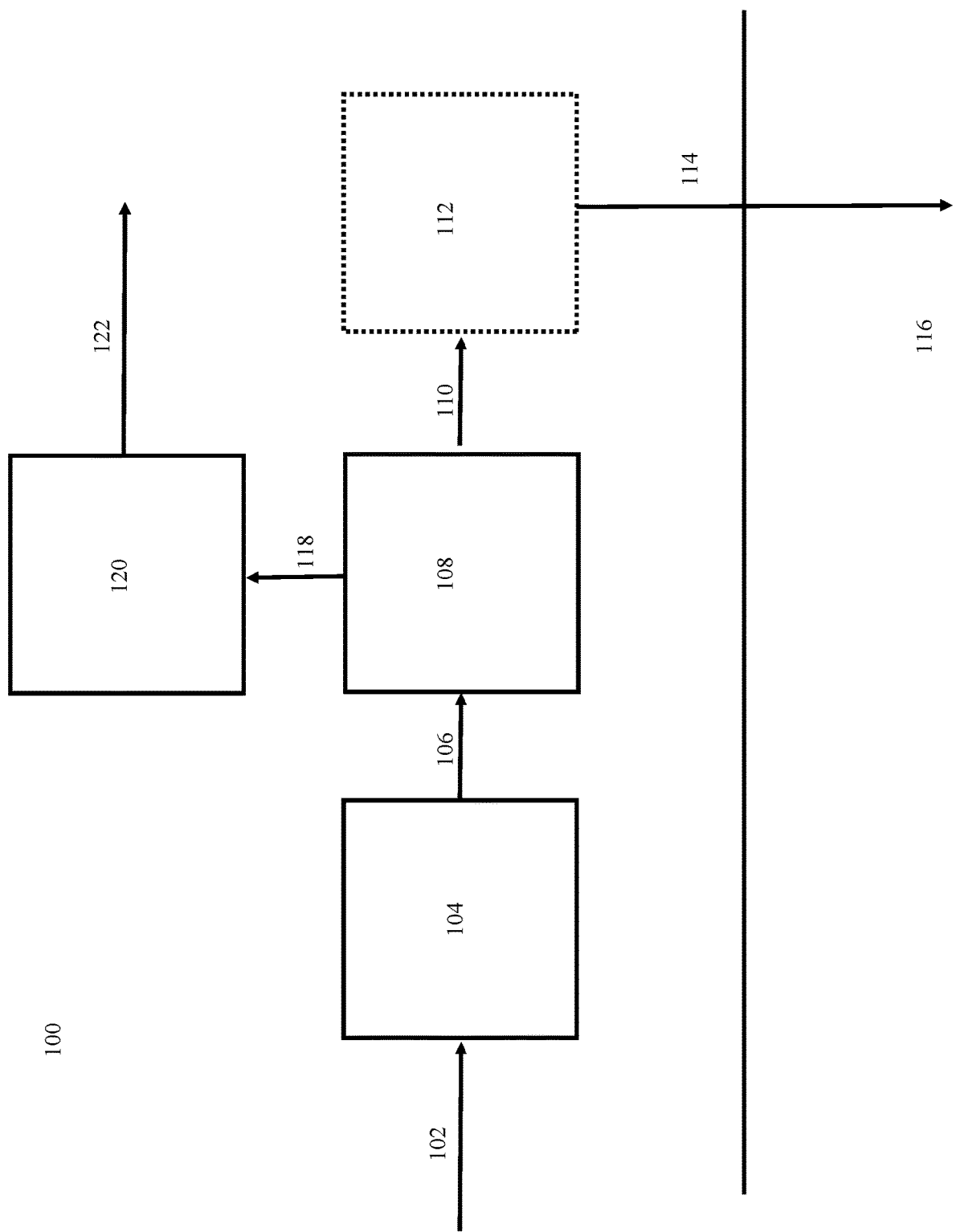

HYDROGEN PRODUCTION FROM HYDROCARBONS WITH NEAR ZERO GREENHOUSE GAS EMISSIONS

PRIORITY

The present application is a non-provisional application claiming priority to and the benefit of U.S. Prov. App. Ser. No. 62/830,945, filed Apr. 8, 2019, the entire disclosure of which is incorporated here by reference.

BACKGROUND

Field

Embodiments of the disclosure relate to synergistic hydrogen production and carbon capture. In particular, embodiments of the disclosure relate to hydrogen production from fossil fuels with substantially no greenhouse gas emissions due to carbon capture via mafic rock, for example basalts.

Description of the Related Art

Hydrogen or $H_2$ is an environmentally-friendly fuel which has the potential to replace greenhouse gas emitting hydrocarbon fuels. For example, hydrogen can be used to power fuel cells. Nearly all $H_2$ currently produced, greater than about 95%, is derived from hydrocarbons, and predominantly from natural gas. Waste $CO_2$ released to the atmosphere (between about 7 and 12 tons $CO_2$ per ton of $H_2$ produced) partially negates the "clean fuel" benefits of $H_2$. To mitigate the carbon footprint of $H_2$ production, economically-impractical methods and systems have been proposed for $H_2$ production combined with capturing, compressing to a liquid, and injecting co-produced $CO_2$ into deep (greater than about 800-850 m underground) sedimentary rock reservoirs in a process known as carbon capture and storage ("CCS"). However, conventional CCS adds significant cost to an already highly-energy-consuming $H_2$ production process, thus rendering the combined technology unfeasible under current market and regulatory conditions.

Previously-proposed combinations of $H_2$ production from hydrocarbons with conventional CCS of $CO_2$, for example in depleted hydrocarbon reservoirs or saline groundwater aquifers, adds significant costs associated with purification, compression, transportation, and injection of $CO_2$. A number of energy-consuming steps are employed to ensure high purity of $CO_2$ (greater than about 98 mol. %) needed to meet the requirements of conventional CCS. And, since standard pressure swing adsorption ("PSA") $H_2$—$CO_2$ separation technology alone does not produce $CO_2$ of sufficient quality and purity for CCS, further purification involving acid gas absorbing reagents, such as Selexol™ (for heavy and solid hydrocarbons) and methyl diethanolamine (MDEA), is needed.

Safe and economic transportation, as well as the injection and long-term storage of $CO_2$ in conventional CCS, depends upon $CO_2$ being compressed to a supercritical (liquid) state, which also adds significant cost. Consequently, underground $CO_2$ storage reservoirs must be located at least about 850 vertical meters below the ground surface to ensure that there is sufficient pressure to keep $CO_2$ in a liquid state, thus adding to the cost of the injection and disposal wells.

Since $CO_2$ in conventional CCS could remain in a liquid and/or compressed gas state for hundreds or thousands of years, sophisticated long-term monitoring programs are needed to ensure that $CO_2$ is truly confined to a given CCS reservoir and does not migrate to overlying aquifers or the surface.

SUMMARY

The present disclosure presents systems and methods for efficient production of hydrogen from hydrocarbon fossil fuels with little to no greenhouse gas emissions. In some embodiments, the first step of the method is co-production of $H_2$ and waste or byproduct $CO_2$ from gaseous, liquid, or solid hydrocarbons (for example steam reforming of natural gas). The co-production of $H_2$ and $CO_2$ from hydrocarbons can be accomplished in various processes. In a second step of the method, $CO_2$ is injected into reactive mafic or ultramafic rocks, where $CO_2$ and/or other waste gases are permanently immobilized as precipitated carbonate minerals. The term mafic generally describes a silicate mineral or igneous rock that is rich in magnesium and iron. Mafic minerals can be dark in color, and rock-forming mafic minerals include olivine, pyroxene, amphibole, and biotite. Examples of mafic rocks include basalt, diabase, and gabbro. Examples of ultramafic rocks include dunite, peridotite, and pyroxenite. Chemically, mafic and ultramafic rocks can be enriched in iron, magnesium, and calcium.

In embodiments of systems and methods, produced hydrogen can be converted reversibly to ammonia for safe storage and transportation in a reduced volume. The versatility of the present carbon capture and storage ("CCS") systems and methods also allows $CO_2$ from other sources such as refining, power production, and desalinization to be immobilized economically, for example in basaltic rock.

To increase the efficiency of synergistic $H_2$ production with $CO_2$ removal, $H_2$ production occurs preceding an alternative CCS process in which $CO_2$ dissolved in water is injected into natural geological sinks comprised of reactive basaltic and ultramafic lithologies, where it rapidly reacts to form stable mineral phases, such as precipitated carbonates. Carbon storage in basalts ("CSB") consumes significantly less energy than other CCS systems and processes, has advantageously high tolerance to acid gas impurities (i.e., $H_2S$), does not require deep wells, such as those 850 m deep or deeper, and does not require long-term reservoir monitoring.

Storage of $CO_2$ in basaltic and ultramafic rocks is unique compared to conventional CCS, because it relies in part on rapidly proceeding chemical reactions which convert $CO_2$ gas to solids, rather than relying on physical storage of $CO_2$ itself, either as a gas or liquid, over time. Economic estimates demonstrate the cost for one metric ton of $CO_2$ captured by presently disclosed systems and methods is substantially less compared to conventional CCS.

In some embodiments, $CO_2$ gas is dissolved in water prior to or during injection into a basalt-containing reservoir, and this avoids difficulties including compressing and maintaining $CO_2$ in a liquid state. Having $CO_2$ dissolved in an aqueous phase helps avoid the need for drilling deep disposal wells deeper than about 850 m below the surface, as is required in conventional CCS. In other words, CSB requires significantly lower pressures to keep sufficient quantities of $CO_2$ dissolved in water, and injection zones can be as shallow as 350 vertical meters below surface for embodiments of the present disclosure.

Rapid immobilization of $CO_2$ as solid, stable carbonate minerals not only ensures permanent removal of $CO_2$ from the environment, but also precludes the need for sophisticated monitoring programs needed at conventional CCS sites. Extreme tolerance of the present technology to the presence of up to about 40 mol. % of other water soluble waste gases such as $H_2S$, which like $CO_2$ is rapidly and substantially completely mineralized in basalts and ultramafics, also has important efficiency implications.

CSB negates the need for expensive and energy consuming steps to remove sulfur/$H_2S$ impurities from $CO_2$ and other gases produced during $H_2$ production. Another important advantage is that in contrast to liquid $CO_2$, which is less dense than reservoir water and thus buoyant, $CO_2$-rich water has higher density than ambient groundwater. Consequently, when injected, $CO_2$-rich water will sink in the reservoir rather than move upwards, which in some embodiments eliminates the need of a caprock—a critically important geological feature of all conventional CCS reservoirs. In embodiments of the present disclosure, injection and storage of $CO_2$ in basalts and mafics has no impact on the quality of groundwater residing in those lithologies. This is particularly important when such aquifers are used to supply drinking water or water for other purposes.

Therefore, disclosed here is a method for producing hydrogen substantially without greenhouse gas emissions, the method including producing a product gas comprising hydrogen and carbon dioxide from a hydrocarbon fuel source; separating hydrogen from the product gas to create a hydrogen product stream and a byproduct stream; injecting the byproduct stream into a reservoir containing mafic rock; and allowing components of the byproduct stream to react in situ with components of the mafic rock to precipitate and store components of the byproduct stream in the reservoir.

In some embodiments, the mafic rock comprises basaltic rock. In other embodiments, before the step of injecting the byproduct stream into the reservoir, the byproduct stream is further treated to separate and purify $CO_2$ from other components to increase $CO_2$ concentration of the byproduct stream for injection into the reservoir. Still other embodiments of the method further comprise the step of liquefying $CO_2$ in the byproduct stream for injection into the reservoir. In some embodiments, the method includes the step of mixing the byproduct stream with water, the byproduct stream comprising $H_2S$. In some embodiments, the method includes the step of reacting the separated hydrogen with nitrogen to form compressed liquid ammonia. Still other embodiments include the steps of transporting the compressed liquid ammonia and returning the compressed liquid ammonia to hydrogen and nitrogen via electrolysis for use of hydrogen as a hydrogen fuel source.

In still yet other embodiments, the step of producing a product gas includes steam reforming or partial oxidation. In certain embodiments, the step of allowing components of the byproduct stream to react in situ with components of the mafic rock to precipitate produces precipitates selected from the group consisting of: calcium carbonates, magnesium carbonates, iron carbonates, and combinations thereof. Still in other embodiments, the reservoir is between about 250 m and about 700 m, or is between about 400 m and about 500 m, below the surface and is between about 150° C. and about 280° C., or less. Temperatures in suitable reservoirs can be as low as about 30° C. In other embodiments, the reservoir is between about 700 m and about 2,200 m below the surface and is less than about 325° C.

Additionally disclosed here is a system for producing hydrogen substantially without greenhouse gas emissions, the system including a hydrogen production unit with a hydrocarbon fuel inlet operable to produce a product gas comprising hydrogen and carbon dioxide from hydrocarbon fuel; a hydrogen separation unit operable to separate hydrogen from the product gas to create a hydrogen product stream and a byproduct stream; and an injection well operable to inject the byproduct stream into a reservoir containing mafic rock to allow components of the byproduct stream to react in situ with components of the mafic rock to precipitate and store components of the byproduct stream in the reservoir. In some embodiments, the mafic rock comprises basaltic rock. In other embodiments, the system includes a byproduct treatment unit to treat the byproduct stream to separate and purify $CO_2$ from other components and to increase $CO_2$ concentration of the byproduct stream for injection into the reservoir.

Still in other embodiments, the system includes a compressor to liquefy $CO_2$ in the byproduct stream for injection into the reservoir. In certain embodiments, the system includes a mixing unit to mix the byproduct stream with water, the byproduct stream comprising $H_2S$. Still in other embodiments, the system includes a reaction unit to react the separated hydrogen with nitrogen to form compressed liquid ammonia. In certain embodiments, the system includes a transportation unit to transport the compressed liquid ammonia and return the compressed liquid ammonia to hydrogen and nitrogen via electrolysis for use of hydrogen as a hydrogen fuel source.

Still in other embodiments, the hydrogen production unit includes a steam reformer or partial oxidation reactor. In some embodiments, components of the produced byproduct stream react in situ with components of the mafic rock to precipitate products selected from the group consisting of: calcium carbonates, magnesium carbonates, iron carbonates, and combinations thereof. Still in other embodiments, the reservoir is between about 250 m and about 700 m, or is between about 400 m and about 500 m, below the surface and is between about 150° C. and about 280° C., or less. Temperatures in suitable reservoirs can be as low as about 30° C. In other embodiments, the reservoir is between about 700 m and about 2,200 m below the surface and is less than about 325° C.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

FIG. 1 shows a schematic flow chart for an example embodiment of a system for simultaneous $H_2$ production, $H_2$ transport, and $CO_2$ sequestration for producing $H_2$ from hydrocarbons with near zero greenhouse gas emissions.

DETAILED DESCRIPTION

So that the manner in which the features and advantages of the embodiments of systems and methods of $H_2$ production from hydrocarbons with near zero greenhouse gas emissions, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The production of $H_2$ from hydrocarbons using technologies such as steam-reforming or partial oxidation/gasification includes three steps. In steam reforming, hydrocarbons, for example methane, are heated in the presence of $H_2O$ (steam) and catalysts to release raw syngas consisting of hydrogen ($H_2$), carbon monoxide (CO), small amounts of carbon dioxide ($CO_2$), and/or other impurities as shown in Equations 1 and 2:

$$CH_4 + H_2O \leftrightarrow CO + 3H_2 \qquad \text{Eq. 1}$$

and/or $$C_nH_m + nH_2O \leftrightarrow nCO + (n+0.5m)H_2 \qquad \text{Eq. 2}$$

The raw syngas is then treated to remove sulfur compounds and/or purified further. $H_2$ yield is then maximized by reacting the raw syngas with $H_2O$ steam in the presence of catalyst to produce $H_2$ and $CO_2$ according to Equation 3:

$$CO + H_2O \rightarrow CO_2 + H_2 \qquad \text{Eq. 3}$$

This is known as a water-gas shift reaction, hence the product is called "shifted" syngas. In partial oxidation, hydrocarbons are reacted with small (non-stoichiometric) amounts of oxygen ($O_2$) to produce raw syngas consisting of $H_2$ and CO according to Equation 4:

$$CH_4 + \tfrac{1}{2}O_2 \rightarrow CO + 2H_2 \qquad \text{Eq. 4}$$

This raw syngas also contains minor amounts of $CO_2$ and/or nitrogen ($N_2$, if air was used instead of pure $O_2$). The raw syngas is then purified, and its $H_2$ content maximized by the reaction of Equation 3. The composition of an example shifted syngas produced by both processes (steam reforming and partial oxidation) is presented in Table 1:

TABLE 1

| Example shifted syngas composition from steam reforming or partial oxidation. | | | | | | | | |
|---|---|---|---|---|---|---|---|---|
| Component | $H_2$ | CO | $CO_2$ | $N_2$ | $O_2$ | Ar | $H_2S$ | $H_2O$ | Other |
| Mol. % | 40.9 | 1 | 29.8 | 2.4 | 0 | 0.4 | 0.01 | 25.4 | 0.11 |

Following water-gas shift, $H_2$ is purified by separation from $CO_2$ and other impurities by processes that employ adsorption, absorption, and/or membrane filtration. One example process is pressure swing adsorption ("PSA"), which uses pressure-dependent selective adsorption properties of materials such as activated carbon, silica, and zeolites. Waste or byproduct $CO_2$ and other impurities separated from $H_2$ during PSA are then vented to the atmosphere. Unfortunately, if a conventional CCS scheme were to be used to sequester $CO_2$, then the $CO_2$ must be purified further and compressed to a liquid (supercritical) state for transportation and injection in a deep reservoir. Both steps, however, are avoided (or simplified significantly) here when CSB is applied instead.

While conventional CCS relies predominantly on physical processes such as the injection and storage of single phase liquid $CO_2$ in non-reactive rock reservoirs (e.g., sandstone, limestone), CSB relies on the naturally occurring chemical reactions between $CO_2$ and mafic and ultramafic rocks to precipitate solid carbonates. Reactions include the following: first $CO_2$ dissolves in and reacts with water (either or both water supplied with $CO_2$ gas at the surface or water present in situ in a mafic reservoir) to form a week carbonic acid as shown in Equations 5-7:

$$CO_2 + H_2O \leftrightarrow H_2CO_{3(aq)} \qquad \text{Eq. 5}$$

$$H_2CO_3 \leftrightarrow HCO_3^- + H^+ \qquad \text{Eq. 6}$$

$$HCO_3^- \leftrightarrow CO_3^{2-} + H^+ \qquad \text{Eq. 7}$$

Acidified water dissolves Ca, Fe, and Mg-rich silicate phases (minerals and/or volcanic glass) which results in the release of divalent metal ions in solution according to Equation 8:

$$(Mg,Fe,Ca)_2SiO_4 + 4H^+ \rightarrow 2(Mg,Fe,Ca)^{2+} + 2H_2O + SiO_{2(aq)} \qquad \text{Eq. 8}$$

$CO_3^{2-}$ formed during the reaction shown in Equation 7 reacts with the divalent metal cations leading to the precipitation of carbonate minerals as shown in Equation 9:

$$(Ca,Mg,Fe)^{2+} + CO_3^{2-} \rightarrow (Ca,Mg,Fe)CO_3 \qquad \text{Eq. 9}$$

Geochemical reaction-transport modeling demonstrates that mineral phases (for example calcite, siderite, and magnesite) will remain stable under prevailing subsurface conditions, hence safely removing $CO_2$ from the atmosphere for hundreds of thousands to millions of years. Other carbonate minerals include ankerite Ca[Fe, Mg, Mn]$(CO3)_2$. In addition, CSB has extreme tolerance for other water soluble acid gas impurities (e.g. $H_2S$, which is also mineralized as sulphides). Such an advantageous quality not only simplifies the process further, eliminating the need to remove those impurities from a gas mixture exiting an $H_2$ production process, but it also allows for simultaneous sequestering of all other $H_2O$ soluble gas contaminants capable of forming stable mineral phases by reacting with basalts/ultramafics.

$CO_2$ dissolution in water for CSB can be achieved by either: a) separately injecting $CO_2$ and water in the tubing and annular space of injector wells and allowing these to mix at or below about a 350 m depth in the wellbore prior to entering the reservoir; orb) dissolving $CO_2$ and water at the surface in a pressurized vessel and then injecting the solution in a basalt/ultramafic reservoir. While the first method generally applies to pure $CO_2$ and/or a mixture of $CO_2$ and other water soluble acid gases, the latter method is used to effectively separate $CO_2$ (and other water soluble gases) from insoluble or weekly soluble impurities, and can therefore be used to process complex flue gas mixtures (e.g. shifted syngas).

Due to certain thermodynamic constraints of $CO_2$ dissolution in water, both methods require about 27 tons of $H_2O$ per 1 ton of $CO_2$ sequestered. In areas where water is in short supply, CSB may be done by injecting supercritical (liquid) $CO_2$ in basalts or ultramafics; however, this would increase energy demands due to the need for liquefying $CO_2$ via compression.

With respect to the produced $H_2$, conventionally $H_2$ is stored and transported as a liquid at a temperature of about −253° C., which requires special double-walled isolated vessels in addition to or alternative to constant refrigeration. However, reversible chemical conversion of $H_2$ into liquid ammonia ($NH_3$) allows storage and transportation of $H_2$ at low pressure and ambient temperatures, at greatly reduced volumes. The reversible $H_2$ to $NH_3$ storage and transport method is inherently safer and advantageous in particular where large volumes of $H_2$ are to be stored and transported.

Due to high tolerance of CSB to impurities in the $CO_2$ stream (such as $H_2S$ and other gases), $CO_2$-rich tail gases from other sources such as refining, power production, and desalinization could, after limited treatment, be either added to the principal waste stream or independently injected into reactive lithologies for permanent immobilization and disposal.

Unexpected and surprising advantages of simultaneously producing $H_2$ from hydrocarbons while using CSB for permanent $CO_2$ immobilization in basalts and ultramafics include significantly lower predicted energy usage and cost due to: lower energy consumption and lower well costs because there is no requirement to compress and liquefy the $CO_2$; lower complexity of operations due to high tolerance to impurities in the $CO_2$ stream; simultaneous removal of $H_2S$ along with $CO_2$ in the reservoirs via precipitation as solids; no need for a reservoir caprock; and no need for sophisticated long-term monitoring programs. There is no need to liquefy $CO_2$ when it is dissolved in water either at the surface or in the wellbore, but it would be liquefied if directly injected in the subsurface as supercritical fluid.

FIG. 1 shows a schematic flow chart for an example embodiment of a system for simultaneous $H_2$ production, $H_2$ transport, and $CO_2$ sequestration for producing $H_2$ from hydrocarbons with near zero greenhouse gas emissions. In system 100, a hydrocarbon inlet 102 provides a hydrocarbon source, for example natural gas, to a hydrogen production system 104. Hydrogen production system 104 might include steam reforming or partial oxidation, and water-gas shift reactions, for example as described in Equations 1-4. Production gases exit via outlet 106 to a separation unit 108. Separation unit 108 is operable to separate hydrogen from $CO_2$ and other byproducts, and can include for example one or more absorption units, adsorption units, membrane separation units, or any suitable separation technology for separating $H_2$ from $CO_2$ and other product gases, such as for example acid gases.

$CO_2$ and additional gases such as acid gases exit separation unit 108 via outlet 110 and can optionally proceed to a further $CO_2$ purification and liquidification unit 112, but need not to. In the case of further $CO_2$ purification and liquidification unit 112, liquefied $CO_2$ is injected into basaltic formation 116 via injection well 114 to form solid precipitated metal carbonates per Equations 5-9. Without optional further $CO_2$ purification and liquidification unit 112, $CO_2$ and additional gases such as acid gases exit separation unit 108 via outlet 110 and proceed directly into basaltic formation 116 via injection well 114 to form solid precipitated metal carbonates per Equations 5-9. $CO_2$ can be mixed with water as a gas at the surface or in situ in basaltic formation 116, or both. Solid carbonate nodules form in vugs and veins in basalt around injection wells and extending outwardly from the injection wells.

Rates of basalt dissolution and mineral carbonation reactions can increase with increasing temperature, and thus higher temperature basaltic reservoirs may be advantageous, while deep reservoirs beyond about 350 m are not required because high pressures are not required to keep $CO_2$ in a pressurized or liquid state. Reservoir temperature can be as low as about 30° C. and as high as about 280° C., but generally not higher than about 325° C., above which temperature certain carbonate minerals become thermodynamically unstable. An example suitable reservoir temperature is about 185° C., or for example between about 150° C. and about 280° C. As explained, injected $CO_2$, either by itself or with other gases, optionally dissolved in water, creates an acidic environment near the injection well, such as injection well 114. Near injection well 114, the acidic fluids remain undersaturated with respect to basaltic minerals and volcanic glass.

Undersaturation and acidity leads to dissolution of host rock basalts in the vicinity of injection wells, such as injection well 114. Mineralization then mostly occurs at a distance away from the injection well (which allows continuous injection of $CO_2$ in a reservoir such as basaltic formation 116), after sufficient dissolution of host basaltic rock neutralizes the acidic water and saturates the formation water with respect to carbonate and sulfur minerals.

Hydrogen exits separation unit 108 at outlet stream 118 to proceed to reaction unit 120 where hydrogen is reacted with nitrogen to form ammonia ($NH_3$). Ammonia exits reaction unit 120 at outlet 122 for reduced volume transport of $H_2$ as $NH_3$. Reaction unit 120 can include a pressurized multistage ammonia production system (PMAPS) to produce ammonia in a pressurized liquid phase. Pressurized liquid $NH_3$ can be transported by a pressurized tanker truck, and using an $NH_3$ electrolyzer, $NH_3$ can be reversibly returned to $N_2$ and $H_2$ wherever hydrogen is required.

The singular forms "a," "an," and "the" include plural referents, unless the context clearly dictates otherwise.

The term "about" when used with respect to a value or range refers to values including plus and minus 5% of the given value or range.

In the drawings and specification, there have been disclosed embodiments of systems and methods for $H_2$ production from hydrocarbons with near zero greenhouse gas emissions of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for producing hydrogen substantially without greenhouse gas emissions, the method comprising the steps of:
    producing a product gas comprising hydrogen and carbon dioxide from a hydrocarbon fuel source;
    separating hydrogen from the product gas to create a hydrogen product stream and a byproduct stream comprising $CO_2$;
    disposing the byproduct stream comprising $CO_2$ in an aqueous phase as a water soluble gas to form a $CO_2$-rich water phase with a density greater than ambient groundwater;
    injecting the byproduct stream into a reservoir containing mafic rock; and
    allowing components of the byproduct stream to react in situ with components of the mafic rock to precipitate and store components of the byproduct stream in the reservoir.

2. The method according to claim 1, where the mafic rock comprises basaltic rock.

3. The method according to claim 1, where before the step of injecting the byproduct stream into the reservoir, the byproduct stream is further treated to separate and purify $CO_2$ from other components to increase $CO_2$ concentration of the byproduct stream for injection into the reservoir.

4. The method according to claim 3, further comprising the step of liquefying $CO_2$ in the byproduct stream for injection into the reservoir.

5. The method according to claim 1, where the byproduct stream further comprises $H_2S$.

6. The method according to claim 1, further comprising the step of reacting the separated hydrogen with nitrogen to form compressed liquid ammonia.

7. The method according to claim 6, further comprising the steps of transporting the compressed liquid ammonia and returning the compressed liquid ammonia to hydrogen and nitrogen via electrolysis for use of hydrogen as a hydrogen fuel source.

8. The method according to claim 1, where the step of producing a product gas includes steam reforming or partial oxidation.

9. The method according to claim 1, where the step of allowing components of the byproduct stream to react in situ with components of the mafic rock to precipitate produces precipitates selected from the group consisting of: calcium carbonates, magnesium carbonates, iron carbonates, and combinations thereof.

10. The method according to claim 1, where the reservoir is between about 250 m and about 2,200 m below the surface and is between about 30° C. and about 325° C.

11. The method according to claim 1, where the reservoir is between about 350 m and about 1,500 m below the surface and is less than about 325° C.

12. The method according to claim 1, wherein a ratio of water in the aqueous phase to $CO_2$ in the byproduct stream comprising $CO_2$ is about 27 tons of $H_2O$ per 1 ton of $CO_2$.

* * * * *